US005727513A

United States Patent [19]
Fischer

[11] Patent Number: 5,727,513
[45] Date of Patent: Mar. 17, 1998

[54] HYPOCYCLOIDAL CRANK TRANSMISSION FOR PISTON ENGINES, PARTICULARLY INTERNAL-COMBUSTION ENGINES

[75] Inventor: Gert Fischer, Feldafing, Germany

[73] Assignee: Bayerische Motoren Werke Atiengesellschaft, Munich, Germany

[21] Appl. No.: 805,743

[22] Filed: Feb. 25, 1997

[30] Foreign Application Priority Data

Mar. 1, 1996 [DE] Germany .......................... 196 07 920.9

[51] Int. Cl.$^6$ .......................... F16H 21/34
[52] U.S. Cl. .......................... 123/197.4
[58] Field of Search .......................... 123/197.1, 197.4, 123/192.1

[56] References Cited

U.S. PATENT DOCUMENTS

| | | | |
|---|---|---|---|
| 3,686,972 | 8/1972 | McWhorter | 123/197.4 |
| 3,886,805 | 6/1975 | Koderman | 74/52 |
| 4,026,252 | 5/1977 | Wrin | 123/197.1 |
| 5,040,502 | 8/1991 | Lassiter | 123/197.4 |
| 5,067,456 | 11/1991 | Beachley et al. | 123/197.4 |
| 5,170,757 | 12/1992 | Gamache | 123/197.4 |
| 5,425,334 | 6/1995 | Yonehara | 123/197.1 |
| 5,465,648 | 11/1995 | Cy | 123/197.4 |
| 5,537,957 | 7/1996 | Gutkin | 123/197.1 |

FOREIGN PATENT DOCUMENTS

| | | |
|---|---|---|
| 1003222 | 11/1951 | France . |
| 11025 | 1/1956 | Germany . |
| 3723948A1 | 11/1988 | Germany . |
| 3927593A1 | 2/1991 | Germany . |
| 4108311A1 | 9/1992 | Germany . |
| 4139716A1 | 6/1993 | Germany . |
| 4142385A1 | 6/1993 | Germany . |
| 4205283A1 | 8/1993 | Germany . |
| 4437132A1 | 5/1995 | Germany . |
| 2254113 | 9/1992 | United Kingdom . |
| WO92/17694 | 10/1992 | WIPO . |

*Primary Examiner*—David A. Okonsky
*Attorney, Agent, or Firm*—Evenson McKeown Edwards & Lenahan, PLLC

[57] ABSTRACT

For a hypocycloidal crank transmission for piston engines, particularly internal-combustion engines, having a lift/guide shaft rotatably arranged in crank webs of a main crankshaft which are rotatably connected in a synchronous manner and having lift eccentrics for an oscillatingly driven piston connecting rod controlled by way of an orthogonal straight-motion mechanism, it is suggested for achieving a one-piece lift/guide shaft that this lift/guide shaft have, as a shaft-side guiding element of the hypocycloidal straight-motion mechanism, a guide eccentric or an eccentric guide pin.

18 Claims, 1 Drawing Sheet

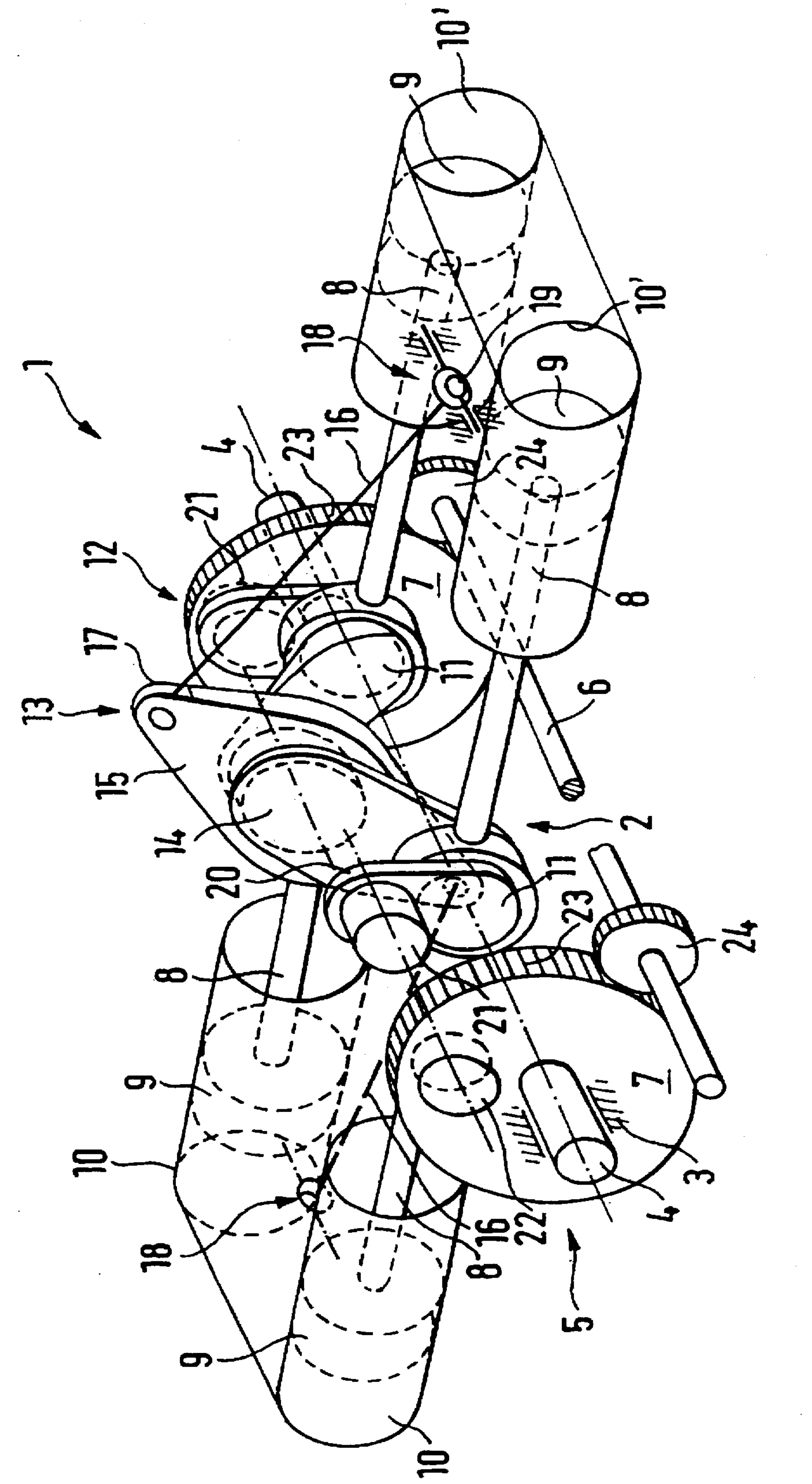
1
10'
9
8
18
19
10'
9
4
23
16
24
21
12
7
8
17
11
13
6
15
14
2
20
11
23
24
8
21
9
7
10
3
4
16
22
18
8
5
9
10

HYPOCYCLOIDAL CRANK TRANSMISSION FOR PISTON ENGINES, PARTICULARLY INTERNAL-COMBUSTION ENGINES

BACKGROUND AND SUMMARY OF THE INVENTION

The present invention relates to a hypocycloidal crank transmission for piston engines, particularly internal-combustion engines.

This application claims the priority of German priority application 196 079 20.9 filed on Mar. 1, 1996, the disclosure of which is expressly incorporated by reference herein.

International Patent Document WO 92/17694 (PCT/GR1/00004) discloses a hypocycloidal crank transmission in which an element, which is fixed to the shaft and is used for the rotational control of the combined lift/guide shaft, is designed as a gear wheel which is arranged between compensating masses of the lift/guide shaft and which cooperates with an internal ring gear arranged in the engine casing. The contents of this International Patent Document WO 92/17694 is incorporated herein by reference thereto. This transmission utilizes known principles of Cardan circles to generate orthogonal straight-line guiding movements.

This known arrangement of a gear wheel with an end side which impacts flush on at least one compensating mass requires a manufacturing of the gear wheel which is separate from that of the lift/guide shaft, which disadvantageously results in manufacturing-related expenditures which are additionally increased particularly in the case of a multicylinder piston engine with a correspondingly constructed lift/guide shaft.

It is an object of the invention to provide for a combined lift/guide shaft of a hypocycloidal crank transmission of the above-mentioned type, an element of the hypocycloidal straight-line motion mechanism which is connected to the shaft and permits a one-piece construction of the lift/guide shaft.

This object is achieved according to preferred embodiments of the invention in that the element of the lift/guide shaft which is connected to the shaft is a guide eccentric which interacts with the hypocycloidal straight-line motion mechanism.

A guide eccentric, which is used instead of the known guide gear wheel and which is known per se, for example, from French Patent Document FR-PS 1 003 222 for a hypocycloidal crank transmission of a different type, advantageously permits the one-piece construction of the combined lift/guide shaft. The disclosure of the French Patent Document is incorporated herein by reference thereto.

In cooperation with a straight-motion element movably guided in/on the engine casing, the guide eccentric arranged according to the invention permits an advantageously direct support of forces acting on the guide eccentric, such as gas forces, in the case of a piston internal-combustion engine against guide surfaces constructed or arranged on the engine casing.

An advantageous supporting of forces against the machine casing is achieved by means of a Watt-type control arm known, for example, from German Patent Document DE-A 41 08 311 as a straight-motion mechanism of the hypocycloidal crank transmission, connected with the constructional advantage of a low space requirement as the result of the coupler in the space of the crank transmission which is arranged on the guide eccentric and which is guided by way of swinging arms linked to the outside of the machine casing. The disclosure of this German Patent Document is incorporated herein by reference thereto.

This advantageous supporting of forces by means of the Watt-type control arm, in the case of a multicylinder piston engine with connecting rods/lift eccentrics arranged on the left/guide shaft in an axially mutually spaced manner, leads to advantageously low constructional expenditures of the hypocycloidal crank transmission in that a single Watt-type control arm is provided which interacts with a guide eccentric arranged essentially in the center between the lift eccentrics, as suggested per se for a hypocycloidal transmission of a different type in German Patent Applications 195 04 890 and 195 09 155. The disclosures of these German patent applications are incorporated herein by reference thereto.

The above-described center arrangement of the Watt-type control arm is particularly advantageous for a multicylinder piston engine with a lift eccentric arranged on the lift/guide shaft for connecting rods of piston, which oscillate in the same direction, in cylinder pairs arranged on both sides of the crankshaft. In order to securely prevent along the whole guiding lift a jamming of the coupler of the Watt-type control arm guided orthogonally with respect to the connecting rods, the swinging arms are connected, at least in the engine-casing-side linking points, with rotatably and fixably constructed adjusting eccentrics as devices for compensating measurement tolerances, as suggested and described in detail in the above-mentioned German Patent Application DE-P 195 04 890.

A design of the lift/guide shaft which is advantageous with respect to stability and mass compensation provides that this shaft be constructed as an auxiliary crankshaft with multiple right-angle bends, in which case the lift eccentric and the guide eccentric are each constructed as pins of diameters which, with respect to their stability, are related to the power. This auxiliary crankshaft which, by way of end-side journals, is rotatably disposed in recesses of the synchronously rotatably connected crankshaft webs of the main crankshaft, is advantageously constructed and manufactured in one piece. This auxiliary crankshaft, which is constructed in this manner and is considered as a transverse beam supported in both ends, in the area of the maximal bending moment, has the guide eccentric constructed as a pin which, with its mass resulting from this dimensioning and the proportional web masses, results in an advantageously approximated mass compensation with respect to the diametrically arranged, smaller-dimensioned lift eccentric pins with proportional web masses about the axis of rotation of the auxiliary crankshaft.

A transmission shaft interacting with a toothing provided on the outer circumference of the crank webs is advantageously suitable for a gearing-up. A transmission shaft which interacts with separate gear wheels on the shaft journals of the main crankshaft is advantageous for a gearing-down. In each of the cases, the respective transmission shaft can additionally be used for driving an assembly close to and/or away from the engine.

Preferably, each of the transmission shafts is arranged in the engine casing in an area which is free of the swinging arms of the Watt-type control arm, advantageously laterally of the moving path of the coupler so that the transmission shaft remains inside the casing contour.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a perspective schematic view of a four-cylinder engine with a hypocycloidal crank transmission constructed in accordance with a preferred embodiment of the present invention.

DETAILED DESCRIPTION OF THE DRAWINGS

A piston engine 1, which is schematically illustrated in the single drawing and is preferably used as an internal-combustion engine, is equipped with a hypocycloidal crank transmission 2. The crank transmission 2 comprises a first crankshaft 5 which is disposed by way of shaft journals 4 in the engine casing 3 and has crank webs 7 which are synchronously rotatably connected by way of a transmission shaft 6.

A driving connection of the first crankshaft 5 with connecting rods 8, which oscillate in the same direction, for respective pistons 9, 9' in cylinders 10, 10' arranged diametrically in pairs takes place by way lift eccentrics or lift pins 11 of a combined lift/guide shaft 12 which is rotatably disposed eccentrically in the crank webs 7 of the first crank shaft 5.

According to the invention, the two lift eccentrics or lift pins 11 of the lift/guide shaft 12 are non-rotatably connected with one another by way of a guide eccentric or guide pin 14 interacting with a hypocycloidal straight-motion mechanism 13. The straight-motion mechanism 13 advantageously comprises a straight-motion element 15 which is movably guided on the engine casing 3 and is directed orthogonally with respect to the oscillating connecting rods 8 and which is designed as a coupler of a Watt-type control arm 17 guided by way of swinging arms pivotally linked to the engine casing 3. Between the axially spaced lift eccentrics or lift pins 11, the lift-guide shaft 12 is preferably equipped in the center with a guide eccentric or guide pin 14 for a single Watt-type control arm 17 between the connecting rods 8. This results in a straight-motion mechanism 13 which is advantageous with respect to the stability while the space requirements are low and which, in addition, while the mounting is simple, permits an adjustment which is accessible from the outside.

According to certain preferred embodiments of the invention, this adjustment is achieved in that at least engine-casing-side linking points 18 of the swinging arms 16 of the Watt-type control arm 17 provided in the center between the connecting rods 8 are equipped with rotatably and fixably constructed adjusting eccentrics 19 as devices for compensating measurement tolerances.

For achieving a bending-resistant lift/guide shaft 12, the lift eccentrics 11 and the guide eccentric 14 are each designed as pins of a one-piece auxiliary crankshaft 20 which has multiple right-angle bends and which is rotatably disposed by way of journals 21 molded on in one piece in eccentrically arranged recesses 22 of the crank webs 7 of the main crankshaft 5.

The drawing also shows that the crank webs 7 of the main crankshaft 5 are provided with toothings 23 on the respective outer circumference for the engagement in gear wheels 24 on the transmission shaft 6. In the illustrated arrangement, the transmission shaft 6 arranged laterally of the orthogonal moving path of the coupler 15 in the engine casing 3 is geared up. It can be used for driving an accessory on the outside or inside of the engine.

Alternative not illustrated embodiments of the invention include a transmission shaft which is geared down and has gear wheels with large diameters which mesh with relatively smaller gear wheels on the journals 4 of the main crankshaft 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Hypocycloidal crank transmission for piston engines, particularly internal-combustion engines, comprising:
   - a crankshaft which is disposed by way of journals in an engine casing and which has crank webs which are synchronously rotatably connected by way of a transmission shaft, and
   - a combined lift/guide shaft eccentrically disposed in a rotatable manner in said crank webs, said combined lift/guide shaft being rotationally controlled by way of an element of a hypocycloidal straight-motion mechanism fixed to the lift/guide shaft that by means of a lift eccentric non-rotatably connected with the lift/guide shaft, a connecting rod driven in an oscillating manner rotatably drives the crankshaft,
   - wherein the element of the lift/guide shaft is a guide eccentric interacting with the hypocycloidal straight-motion mechanism.
2. The crank transmission according to claim 1, wherein the guide eccentric interacts with the straight-motion mechanism which is movably guided on the engine casing and is directed orthogonally with respect to the oscillating connecting rod.
3. The crank transmission according to claim 1 wherein the hypocycloidal straight-motion mechanism is a Watt-type control arm with a coupler as a straight-motion element which is guided by way of swinging arms pivotally linked to the engine casing and is disposed on the guide eccentric.
4. The crank transmission according to claim 1, wherein the lift/guide shaft has connecting rods in the form of lift eccentrics which are axially spaced at a mutual distance, and
   - wherein a single Watt-type control arm is provided which interacts with a guide eccentric arranged essentially in the center between the lift eccentrics.
5. The crank transmission according to claim 4, wherein the lift/guide shaft lift eccentrics are arranged diametrically with respect to the guide eccentric, said lift eccentrics being connected to the respective connecting reds which oscillate in the same direction as respective pistons arranged in cylinder pairs on both sides of the crankshaft,
   - wherein, at least engine-casing-side linking points of swinging arms of the Watt-type control arm provided between the connecting rods are equipped with rotatably and fixably constructed adjusting eccentrics as devices for compensating manufacturing tolerances.
6. The crank transmission according to claim 1, wherein the lift eccentrics and the guide eccentric are each constructed as pins of the lift/guide shaft which has several right-angle bends and is used as an auxiliary crankshaft, and
   - wherein the auxiliary crankshaft is rotatably disposed by way of journals in recesses of the crank webs of the main crankshaft.
7. The crank transmission according to claim 6, wherein the auxiliary crankshaft is constructed in one piece.
8. The crank transmission according to claim 1, wherein the crank webs of the main crankshaft are provided with toothings on their respective outer circumference for the engagement in respective gear wheels on the transmission shaft.

9. The crank transmission according to claim 1, wherein respective first gear wheels are arranged on each journal of the main crankshaft, for the engagement in respective second gear wheels of the transmission shaft.

10. The crank transmission according to claim 2, wherein the hypocycloidal straight-motion mechanism is a Watt-type control arm with a coupler as the straight-motion element which is guided by way of swinging arms pivotally linked to the engine casing and is disposed on the guide eccentric.

11. The crank transmission according to claim 10, wherein the lift/guide shaft has connecting rods in the form of the lift eccentrics which are axially spaced at a mutual distance, and wherein the single Watt-type control arm is provided which interacts with the guide eccentric arranged essentially in the center between the lift eccentrics.

12. The crank transmission according to claim 11, wherein the lift/guide shaft lift eccentrics are arranged diametrically with respect to the guide eccentric, said lift eccentrics being connected to the respective connecting rods which oscillate in the same direction as respective pistons arranged in cylinder pairs on both sides of the crankshaft, wherein, at least engine-casing-side linking points of the swinging arms of the Watt-type control arm provided between the connecting rods are equipped with rotatably and fixably constructed adjusting eccentrics as devices for compensating manufacturing tolerances.

13. The crank transmission according to claim 10, wherein the lift eccentrics and the guide eccentric are each constructed as pins of the lift/guide shaft which has several right-angle bends and is used as an auxiliary crankshaft, and wherein the auxiliary crankshaft is rotatably disposed by way of journals in recesses of the crank webs of the main crankshaft.

14. The crank transmission according to claim 10, wherein the crank webs of the main crankshaft are provided with toothings on their respective outer circumference for the engagement in respective gear wheels on the transmission shaft.

15. The crank transmission according to claim 14, wherein respective first gear wheels are arranged on each journal of the main crankshaft, for the engagement in respective second gear wheels of the transmission shaft.

16. Hypocycloidal crank transmission for an internal combustion engine having opposed linearly reciprocating pistons, comprising:

an engine output crankshaft extending along a crankshaft axis and having a pair of axially spaced crank webs, and a combined lift/guide shaft eccentrically rotatably disposed in said crank webs and serving to transmit axial reciprocating movement of engine pistons to rotatably drive the crankshaft, wherein a guide eccentric is fixed to the lift/guide shaft, said guide eccentric interacting with a straight motion coupler movably guided at an engine casing.

17. The hypocycloidal crank transmission according to claim 16, wherein the lift/guide shaft has connecting rods in the form of lift eccentrics which are axially spaced at a mutual distance, and wherein a single Watt-type control arm is provided which interacts with the guide eccentric arranged essentially in the center between the lift eccentrics.

18. The hypocycloidal crank transmission according to claim 17, wherein the lift/guide shaft has the lift eccentrics arranged diametrically with respect to the guide eccentric, said lift eccentrics being connected to the respective connecting rods which oscillate in the same direction as respective pistons arranged in cylinder pairs on both sides of the crankshaft, wherein, at least engine-casing-side linking points of swinging arms of the Watt-type control arm provided between the connecting rods are equipped with rotatably and fixably constructed adjusting eccentrics as devices for compensating manufacturing tolerances.

* * * * *